United States Patent [19]
Madison, Jr. et al.

[11] Patent Number: 5,887,139
[45] Date of Patent: Mar. 23, 1999

[54] CONFIGURABLE GRAPHICAL USER INTERFACE USEFUL IN MANAGING DEVICES CONNECTED TO A NETWORK

[75] Inventors: Carl T. Madison, Jr., Hopkinton; Richard C. Flathers, Southboro, both of Mass.

[73] Assignee: 3Com Corporation, Santa Clara, Calif.

[21] Appl. No.: 699,250

[22] Filed: Aug. 19, 1996

[51] Int. Cl.$^6$ .................................................. G06F 17/00
[52] U.S. Cl. ......................................................... 395/200.53
[58] Field of Search .......................... 395/200.8, 200.79, 395/200.49, 200.53, 200.54, 200.55, 200.5, 200.51, 200.56; 340/825.06, 825.07, 825.08; 345/334, 348

[56] References Cited

U.S. PATENT DOCUMENTS 5,426,421  6/1995  Gary ................................... 340/285.15

OTHER PUBLICATIONS

Weinman, "The CGI Book", Chapter 7, Mar. 1, 1996.
Brown, "Using Netscape 2", Chapter 34, 1995.

*Primary Examiner*—Ellis B. Ramirez
*Attorney, Agent, or Firm*—Fish & Richardson P.C.

[57] ABSTRACT

A system for providing a configurable graphical user interface useful in managing network devices connected to a network, the system using one or more servers and one or more clients, each server receiving messages from and sending messages to a set of the network devices via a standard server/device protocol, each client communicating with at least one server via a client/server protocol and providing a graphical user interface for receiving requests from a user and displaying information to the user relating to the network devices, the client initiating a graphical user interface in response to a user input by sending an initiation message to the server, and the server then sending resource information and a data stream relating to the current state of the network devices, the client creating a graphical user interface that provides a display relating to the state of the network devices based upon the resource information and data stream, the resource information providing a context for data in the data stream.

48 Claims, 14 Drawing Sheets

User Starts Application from Browser

| Client | | Server |
|---|---|---|
| Web Browser/User Interface Application | Web Server/ Resource Application | Daemon/Data Stream Application |
| User attempts to load a specific Web Page from the Server via Web Browser using HTML. | | |
| | Web Server gets request and responds by executing Resource Application | |
| | Resource Application sends the following to the Web browser:<br><br>1. The HTML framework to support a user interface application.<br><br>2. The resource information used to define the display format in the user interface application, the expected data streams, the host Daemon is running on, the port to which the Daemon is attached, and any other context information the User Interface Application may need to send messages to the Daemon.<br><br>Resource Application then terminates. | |
| Web Browser requests the User Interface Application code from the Web Server | | |
| | Web Server sends the User Interface Appication code to the Web Browser | |

FIG. 3A

| | | |
|---|---|---|
| User Interface Application begins execution, looks at resource information, and sets up its window according to the resource information supplied. | | |
| User interface application initiates a TCP network connection back to the Server Daemon. | | |
| | | Server Daemon connects to the User Interface Application |
| The user interface application accepts the network connection and first sends some of the resource information to the Server Daemon. | | |
| | | Server Daemon spawns an appropriate Data Stream Application. Resource information returned is used to inform the spawned Data Stream Application what to start doing. |
| | | The Spawned Data Stream Application gets the resource information and decodes it. It then begins supplying (over the network connection) the appropriate data back to the User Interface Application. It also prepares for more asynchonous input from the User Interface Application. |
| The User Interface Application starts receiving the data streams from the spawned Data Stream Application and updating its displays accordingly | | |

FIG. 3B

| Alarm Log | |
|---|---|
| Description | Time |
| ...IP Address 158.101.86.11 mapped to MAC Address 0002ba833000 | 76128250 |
| ...IP Address 0.0.0.0 mapped to MAC Address 0002ba00367b | 76061742 |
| ...IP Address 158.101.85.104 mapped to MAC Address 002ba000179 | 58632095 |
| ...IP Address 158.101.85.141 mapped to MAC Address 0002ba00372e | 58338008 |
| ...IP Address 158.101.85.142 mapped to MAC Address 0002ba0038a5 | 51173870 |
| ...Ring exited BEACONING state (ring NORMAL) | 42156091 |
| ...Ring entered BEACONING state | 42156087 |
| ...IP Address 158.101.85.221 mapped to MAC Address 0002ba7f8340 | 25065781 |
| ...IP Address 158.101.85.223 mapped to MAC Address 0002ba832ed0 | 24694231 |
| ...IP Address 158.101.85.219 mapped to MAC Address 0002ba832ec0 | 24504272 |
| ...Ring exited BEACONING state (ring NORMAL) | 22893194 |
| ...Ring entered BEACONING state | 22893187 |
| ...RO Inserted on 020203 | 16817663 |
| ...RO Deinserted on 020203 | 16816002 |
| ...RO Inserted on 020203 | 16809697 |
| ...RO Deinserted on 020203 | 16808881 |
| ...IP Address 158.101.85.170 mapped to MAC Address 0020affa9629 | 15386858 |
| ...IP Address 158.101.85.153 mapped to MAC Address 0002ba0038e8 | 296760 |
| ...IP Address 158.101.85.221 mapped to MAC Address 0002ba7f8350 | 84814 |
| ...IP Address 158.101.85.143 mapped to MAC Address 0002ba00367b | 68688 |
| ...IP Address 158.101.85.151 mapped to MAC Address 0002ba000eca | 60676 |
| ...IP Address 158.101.85.111 mapped to MAC Address 0002ba000223 | 24791 |
| ...IP Address 158.101.85.101 mapped to MAC Address 0002ba0001b3 | 4205 |
| ...Agent MAC on plug-in Inserted into 020203 | 2270 |
| ...New 24-Port Superstack Device Detected 000fd5 | 1649 |
| ...IP Address 158.101.85.254 mapped to MAC Address 1000040502cf4 | 1587 |
| ...New 12-Port Superstack Device Detected 00020a | 1369 |
| ...New 24-Port Superstack Device Detected 020203 | 1063 |

☐ Lobe Status Event ☐ Main Ping Status Event ☐ Auto Isolation Error Event ☐ Hub Configuration Event
☐ Hard Error Event ☐ Hard Error Event ☐ MAC Address Change Event

UNTRUSTED JAVA APPLET WINDOW

FIG. 8

User Action 1 inside a User Interface Application

| Client | Server | |
|---|---|---|
| Web Browser/User Interface Application | Web Server/ Resource Application | Daemon/Data Stream Application |
| User initiates action on User Interface Application. The User Interface Application asks the Web Server to publish a new page. The page location is supplied as part of the Resource Informaion (in the case of a fixed button) or as part of a data stream (in the case of a graphic object on a display canvas) | | |
| | Web Server gets request and responds by executing an external application causing the entire process of Fig. 3 to repeat. using information supplied from User Interface Application. The previous data stream application is terminated. | |

FIG. 9

User Action 2 inside a User Interface Application

| Client | Server | |
|---|---|---|
| Web Browser/User Interface Application | Web Server/ Resource Application | Daemon/Data Stream Application |
| User initiates action on User Interface Application. A message is sent back to the Data Stream Application over the network connection. The message content is supplied as part of the Resource Informaion (in the case of a fixed button) or as part of a data stream (in the case of a graphic object on a display canvas) | | |
| | | The spawned Data Stream Application receives the message and acts upon it. Action could include: 1. Change data of one the data streams 2. Add a new object to the graphic canvas 3. Change the status of a remote object (isolate a data port) |

FIG. 10

User Action 3 inside a User Interface Application

| Client | Server | |
|---|---|---|
| Web Browser/User Interface Application | Web Server/ Resource Application | Daemon/Data Stream Application |
| User initiates action on User Interface Application. The User Interface Application initiates a network connection back to the Server Daemon. The specifics of the Server Daemon are supplied as part of the Resource Informaion (in the case of a fixed button) or as part of a data stream (in the case of a graphic object on a display canvas). The applet spawns a new User Interface Application to handle the new network connection | | |
| | | Server Daemon connects to the User Interface application and then spawns a new Data Stream Application to handle the data exhange between server and the spawned User Interface Application. |
| The spawned User Interface Application accepts the network connection and first sends some context information to the spawned Data Stream Application. This is similar to Fig. 3, however the specifics of the context information are supplied as part of the Resource Information (in the case of a fixed button) or as part of a data stream (in the case of a graphic object on a display canvas) | | |

FIG. 11A

| Web Browser/User Interface Application | Web Server/Resource Application | Daemon/Data Stream Application |
|---|---|---|
| | | The Spawned Data Stream Application decodes the context information and acts upon it. Part of the context information indicates that this is a new thread so the Data Stream Application first sends the same Resource Information (the format is slightly different) that the Web Server provided in the Fig. 3 process over the network connection to the Spawned User Interface Application. |
| | | It then begins supplying (over the network connection) the appropriate data back to the Spawned User Interface Application. It also prepares for more asynchronous input from the Spawned User Interface Application. |
| The Spawned User Interface Application accepts the Resource Information and creates a new window specified by the Resource Information | | |
| The Spawned User Interface Application starts receiving the data streams from the spawned Data Stream Application and updating its displays accordingly | | |

FIG. 11B

CONFIGURABLE GRAPHICAL USER INTERFACE USEFUL IN MANAGING DEVICES CONNECTED TO A NETWORK

BACKGROUND OF THE INVENTION

The invention relates to a configurable graphical user interface useful in managing devices connected to a network.

A common approach for managing a network involves a hardware platform and a software application which allow the customer to manage devices connected to the network. The software application provides a graphical user interface that displays information on variables relating to network operation and devices on the network and receives user instructions and requests. As the additional devices are added to the network, the load on the network management system increases. If the limitations of the hardware and software are reached, the system must be upgraded or replaced.

SUMMARY OF THE INVENTION

In one aspect, the invention features, in general, a system for providing a configurable graphical user interface with respect to one or more variables of interest. The system includes a server connected to receive and/or send information relating to the variables and a client that communicates with the server via a client/server protocol and provides a user interface for receiving requests from a user and displaying information to the user relating to the variables. The client initiates a graphical user interface in response to a user input by sending an initiation message to the server. The server then sends the client resource information establishing a context for interpretation and display of data relating to the variables and a data stream relating to the current state of the variables. The client creates a display relating to the state of the variables based upon the resource information and the data stream.

In another aspect, the invention features, in general, managing network devices connected to a network using one or more servers and one or more clients. Each server receives messages from and sends messages to a set of the network devices via a standard server/device protocol. Each client communicates with at least one server via a client/server protocol and provides a graphical user interface for receiving requests from a user and displaying information to the user relating to the network devices. The client initiates a graphical user interface in response to a user input by sending an initiation message to the server, and the server then sends resource information and a data stream relating to the current state of the network devices. The client creates a graphical user interface that provides a display relating to the state of the network devices based upon the resource information and data stream, the resource information providing a context for data in the data stream.

Certain implementations of the invention may include one or more of the following features. In certain implementations, the server and client are resident on separate platforms and are connected by a network. The resource information is provided by an application that resides on the server and is launched in response to the initiation message. The server also includes a data stream application that sends the data stream over the network to the client. The graphical user interface is provided by a user interface application that is sent from the server to the client subsequent to the initiation message, and the resource information determines the configuration of the display. The client includes a web browser that sends the initiation message, and the server includes a web server that receives the initiation message and launches the resource application in response to the initiation message. The data stream application is launched by a data stream initiator resident on the server.

In certain implementations, the user interface application provides an interface for a user to change the system after it has been initiated. One type of change involves replacing the user interface application and the data stream application with a new user interface application and a new data stream application. Another type of change involves changing a data stream or a graphic object displayed on the graphical user interface. Another type of change involves adding a new user interface application and a new data stream application.

In certain implementations, there are a plurality of data streams sent from the server to the client, each data stream relating to a different variable or network device. A single data stream can convey information about a plurality of network devices. The graphical user interface can include a plurality of displays based upon a single data stream. The data stream can convey graphical data used to create a graphic object (e.g., icon or a small picture) on the graphical user interface. The resource information can include the name of a file containing the graphical data for a graphic object. The data stream can convey numerical data used to draw a representation of the values of the data (e.g., as a pie chart, bar graph, or line graph) on the graphical user interface. The resource information can include entries defining displays to be created to provide the representation and the format for data in the data stream.

In certain implementations, the resource information includes a list of parameter names and parameter values defining the display and the data stream. The parameter names and values specify the identity of the server and its location. The parameter names identify buttons that will appear on the display, and the parameter values specify actions to be taken when the buttons are activated. A parameter name and associated value identify a button row length for the buttons appearing on the display. The parameter names and values identify a window title, the display layout, and colors to be used. The parameter names and values identify the number of data streams, the types of data streams, and names of data streams.

Embodiments of the invention may include one or more of the following advantages. The system is easily extensible to incorporate additional network devices. The graphical user interface is highly configurable and can be modified at any time. A simple platform can be used for the client, and it can be located anywhere that a network connection can be established to communicate with the server. The use of resource information to provide context for data in a data stream permits displays to be updated quickly and efficiently with a relatively small amount of data being sent over the network from the server to the client. The code for a user interface application can be stored remotely and only need be accessed when it is actually being used.

BRIEF DESCRIPTION OF THE DRAWINGS

FIGS. 3A and 3B are a diagram showing the operations of the client and server components in initiating operation of the FIG. 1 system.

FIGS. 4–8 are illustrations of displays shown on a monitor of the FIG. 1 system.

FIGS. 9–11A and 11B are diagrams showing the operations of the client and server components of the FIG. 1 system in response to user-initiated changes.

DESCRIPTION OF THE PREFERRED EMBODIMENTS

Figure 1:
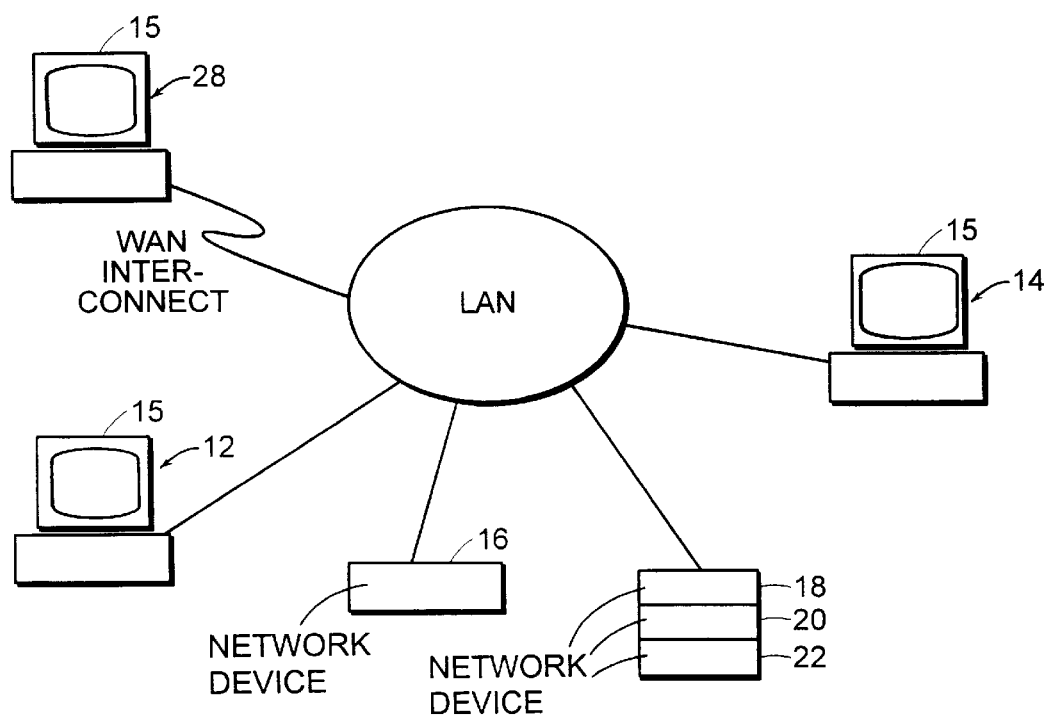
FIG. 1 is a diagram of a system for managing devices connected to a network.

Referring to FIG. 1, there is shown system 10 for managing network devices. System 10 includes a client device 12, a server device 14, and a plurality of network devices 16, 18, 20, 22 managed by client device 12. Client and server devices 12, 14 can be desktop computers on a Unix- or PC-based platforms and each include a monitor 15 for display of graphical and textual information and keyboard and mouse input devices (not shown). Network devices 16–22 can include network hubs, workstations, local area network (LAN) interconnect devices, printers, and various other devices connected to the network and controlled and monitored by a network manager at client device 12. Network devices 16–22 could alternately be other types of electrical devices, e.g., medical devices, building control, or plant equipment, communicating over a computer network and controlled by server device 14 and client device 12.

In the implementation shown in FIG. 1, client device 12, server device 14 and network devices 16–22 are connected to LAN 24. There also can be one or more remote client devices 28 connected by wide area network (WAN) interconnect 26 to LAN 24 in addition to or in place of local client device 12. Typically server device 14 is connected to the same LAN as the network devices under its control. There could be a plurality of server devices 14 controlled by one or more client devices 12, 28.

Figure 2:
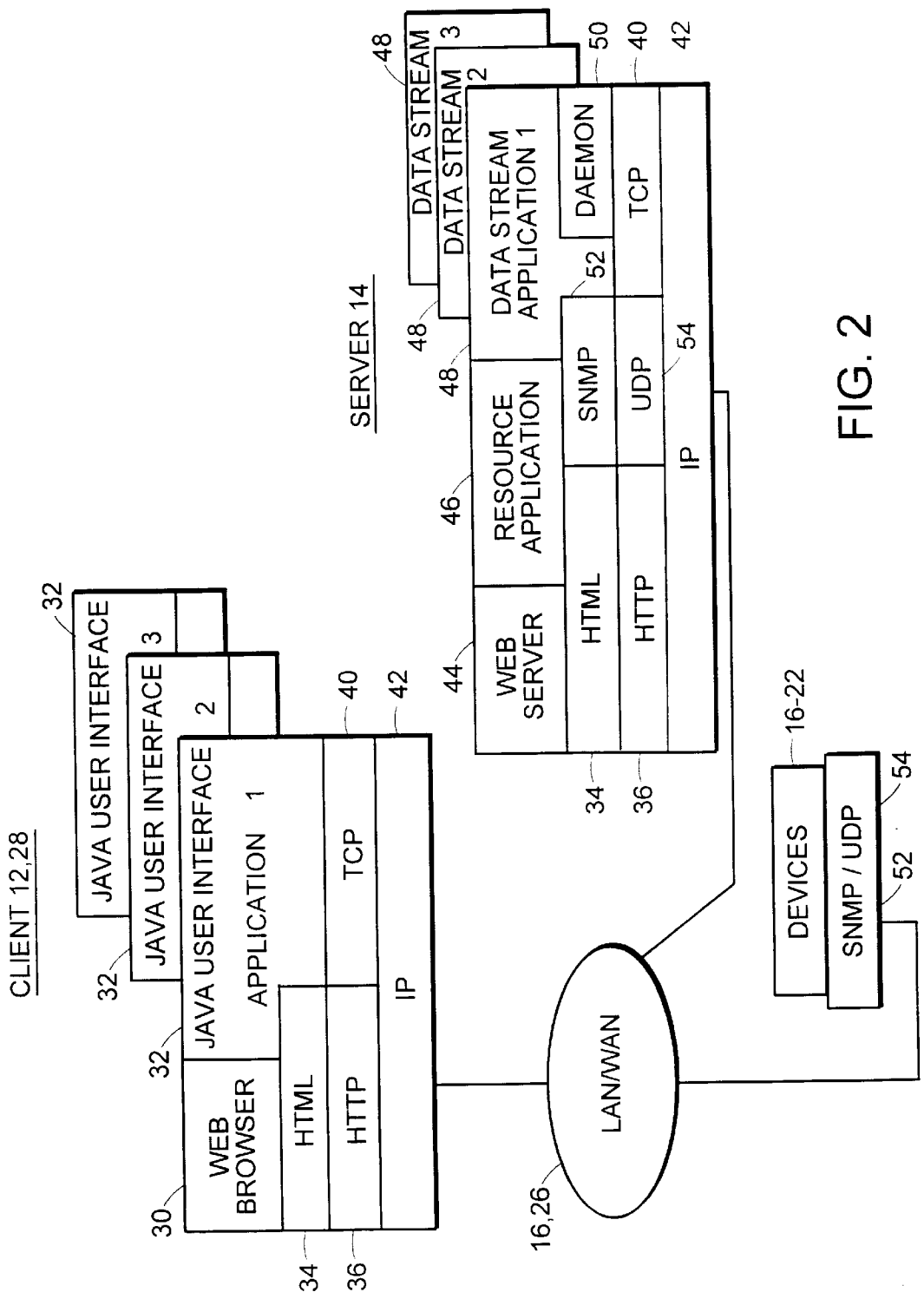
FIG. 2 is a diagram showing the software architecture of the components of the FIG. 1 system.

Referring to FIG. 2, the software architecture is shown for the components of FIG. 1. Client 12 includes Web browser 30 (available under the Netscape Navigator trade designation or equivalent) and one or more user interface applications 32 programmed in Java computer language. Client device 12 initially includes web browser 30 but does not include user interface applications 32, which are sent from server device 14 as they are needed. Web browser 30 communicates in hypertext markup language (HTML) 34 (used for web pages) and sends messages over the network via hypertext transfer protocol (HTTP), as graphically indicated by HTML 34 and HTTP 36 on FIG. 2. User interface applications 32 can communicate over the network via HTML 34 and HTTP 36 and also by transport control protocol (TCP) 40. All messages are sent via internet protocol (IP) 42.

Server device 14 includes commercially available web server 44 (e.g., available under the Netscape Server trade designation or equivalent), resource application 46, and one or more data stream applications 48. Resource application 46 is executed during initiation of the system and is then terminated, and data stream applications 48 are created by daemon 50, which acts as a data stream initiator, as they are needed. Web server 44 communicates over the network via HTML 34 and HTTP 36. Resource application 46 can communicate over the network via HTML 34 and HTTP 36 and also by TCP 40 and simple network management protocol (SNMP) stack 52 over user datagram protocol (UDP) 54. Data stream applications 48 communicate over the network via SNMP 52 over UDP 54 when communicating with network devices 16–22. Data stream applications 48 communicate over the network via TCP 50 when communicating with user interface applications 32. There typically is a one-to-one relationship between a data stream application 48 and a user interface application 32.

Network devices 16–22 communicate over the network with data stream applications 48 via SNMP 52 over UDP 54.

The various languages and network protocols noted above or elsewhere herein are defined by the Internet Engineering Task Force (IETF) in the following Requests for Comments (RFCs), which are periodically updated by the IETF:

| Protocol | RFC |
|----------|------|
| HTML | 1866 |
| HTTP | 1945 |
| TCP | 793 |
| IP | 791 |
| SNMP | 1157 |
| UDP | 768 |
| RMON | 1757 |

FIGS. 3A adn 3B show the steps involved in initiating the network management system 10. The user can manage the system from any desktop that has a web browser 30 and can communicate over a network (or combination of networks) to server device 14. The user interface applications 32 needed for display are obtained from server device 14, and the user interface application 32 receives "resource information" as part of the setup to provide context for data sent later, so that a minimum of amount of data can be sent over the network for updating the displays on client device 12.

The user at client device 12 or 28 initiates operation by accessing web browser 30. The user selects a server device 14 from a menu or otherwise, and the name of the selected server 14 (here "artemis.st.3com.com" is displayed in location box 58, which causes a request to be sent to web server 44 at server device 14. This causes the display of an HTML file on web browser 30 (after the file has been sent from web server 44). The user can then start the resource application 46 by clicking on an HTML link. Web server 14 then executes resource application 46 (stored on local disk of device 14). Resource application 46 performs the steps indicated on FIGS. 3A and 3B, including sending resource information to web browser 30 over the network in HTML, and then terminates. As is discussed below, the resource information defines the context for interpretation and display of data to be sent later regarding one or more network devices 16–22. After receiving the resource information, web browser 30 then requests the code for a user interface application 32, and web server 44 accesses the code stored on its local disk and sends it to web browser 30. User application 32 then executes on client device 12, setting up a window, e.g., topology view window 58, according to the resource information that had been sent earlier. User application 32 also sets up a connection via TCP 40 to server daemon 50, and sends server daemon 50 items in the list of resource information used by server daemon 50 in selecting the appropriate data stream application 48 from local disk.

Figure 6:
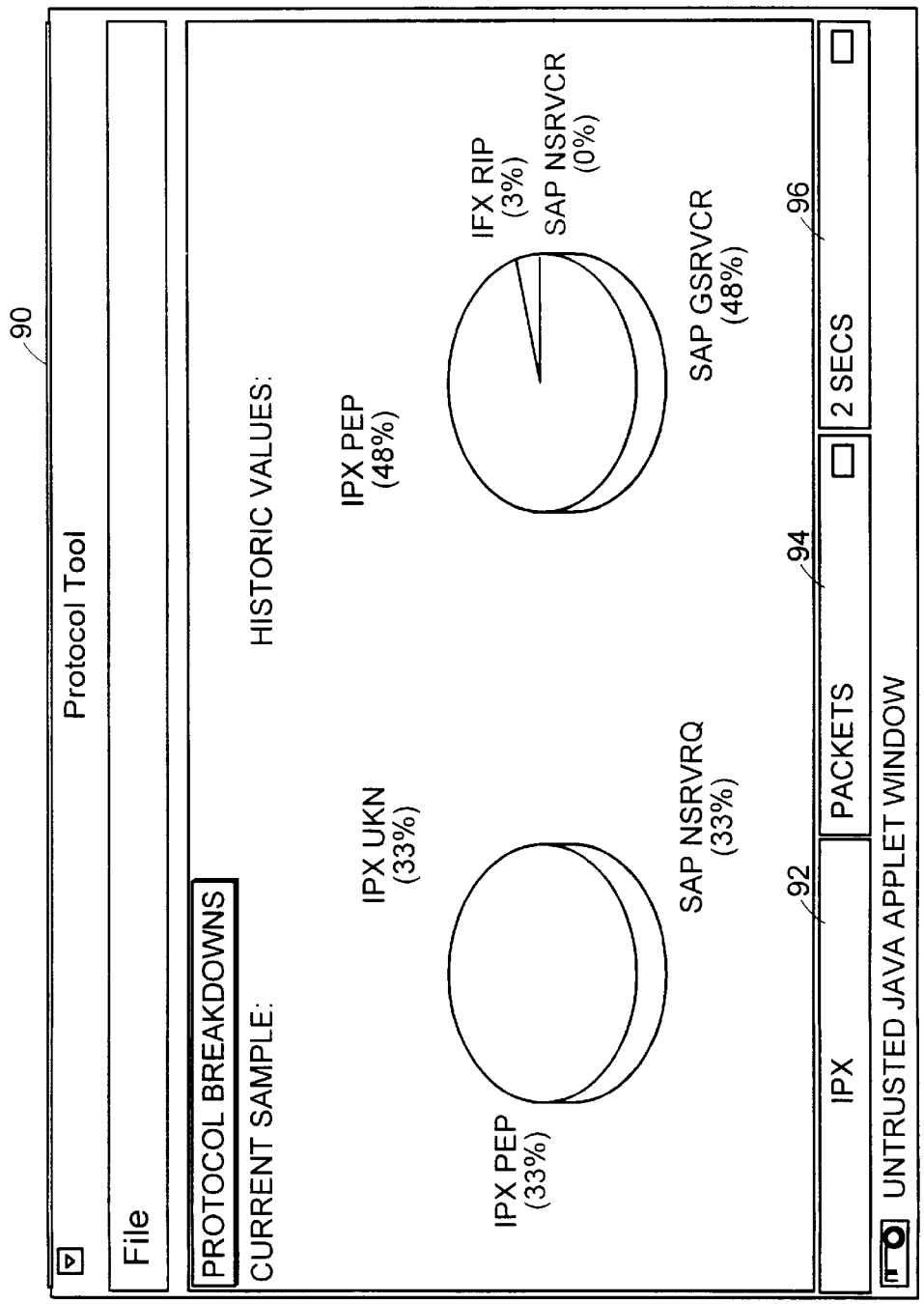
Figure 7:
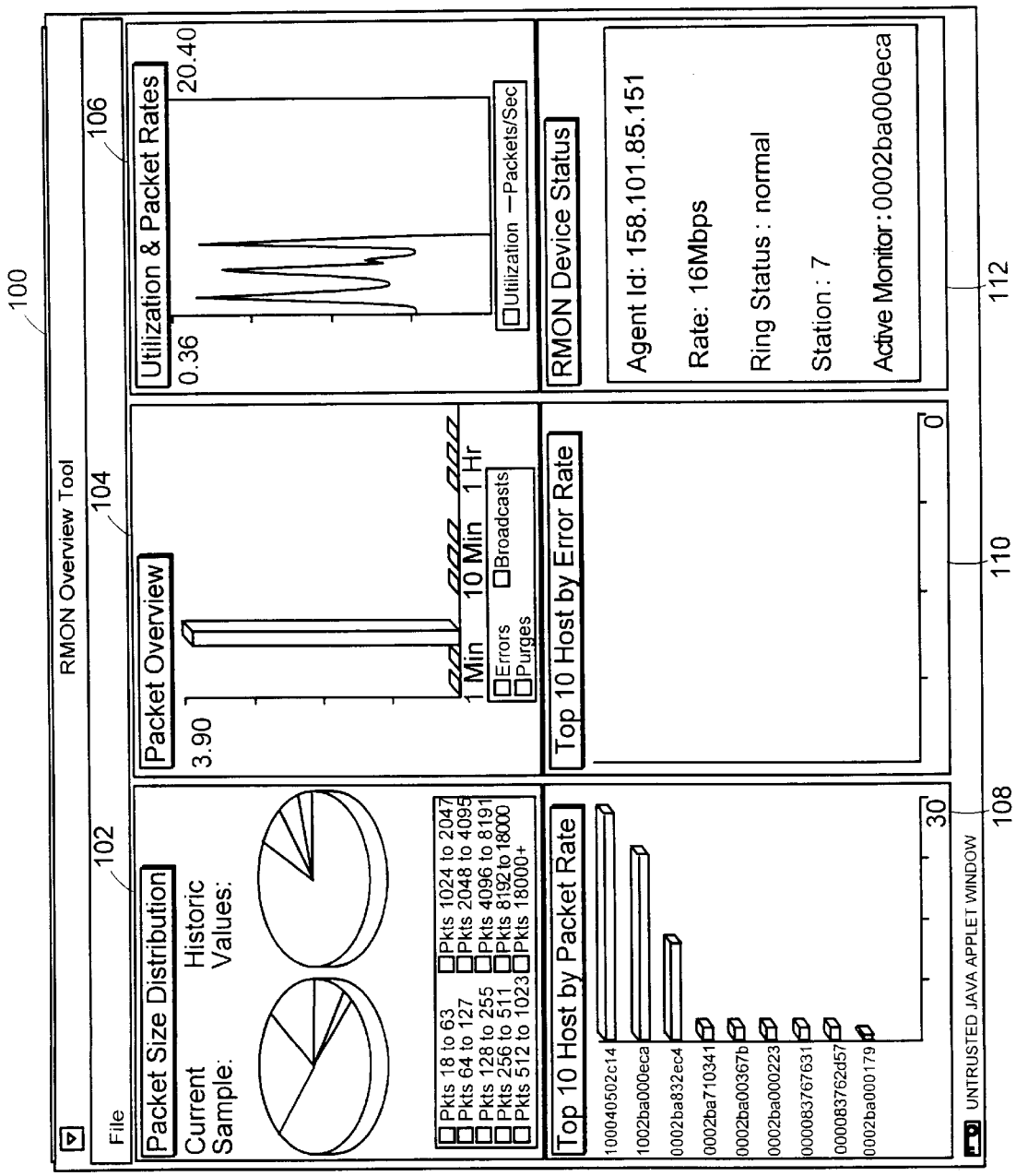

There are two types of data streams. The first is referred to as DrawData and is used to provide essentially static images such as icons and window layout as used in the Topology View and Device Management Windows FIGS. 4 and 5. The second type is referred to as GraphData and is used to provide a display that presents data such as data relating to a dynamic parameter relating to the operation of a device being controlled or data in a database, as shown in FIGS. 6 and 7.

The types of displays supported include:

VBAR (a vertical bar graph),

HBAR (a horizontal bar graph, e.g., 108 on FIG. 7),

TEXT (text on a display),

LIST (a scroll box, e.g., as shown in FIG. 8),

GRAPHIC (an image, e.g., icon 60 on FIG. 4),

PIE (a pie chart, e.g., 102 on FIG. 7),

AVEVBAR (average vertical bar graph, e.g., 104 on FIG. 7),

VLINE (a vertical line graph, e.g., 106 on FIG. 7),

The resource information is a list of parameter names and parameter values (a parameter value being associated with each parameter name) that define the windows displayed. The parameters include:

identity of the server and its location, name and socket location of resource application, name of user initiating the resource application, buttons that will appear on the display, button row length, window title, the display layout, the number of data streams, type of data streams (i.e., DrawData or GraphData), names of data streams (e.g., names of images for DrawData), parameters related to components in each data stream and its display, and colors of display.

The parameter values in some cases completely specify the parameter (e.g., where it is a number, a type, or a color).

For DrawData data streams, the parameter values identify a file (e.g., for an icon) stored on the server which is then accessed by the user interface application to create the desired display. The image files can be in graphical interchange format (GIF) or Joint Photographers Experts Group (JPEG) format. Where clicking on an icon initiates an operation, that operation is defined in the data stream for the icon.

For buttons the parameter values define the actions to be taken when the button is activated. In some cases this will define what will be displayed in a new window.

For GraphData data streams, the parameter values (1) define the display, and (2) specify the layout of the values in the data stream in order to provide a context for the data that will be sent later from the data stream application to the user interface application and used to update a display such as a graph or chart. E.g., the GraphData stream could be as follows:

Begin, 0
23, 34
2, 6
3, 9
2, 65
End,

It may be desirable to update a particular dynamic parameter of interest at intervals of 5 seconds. As can be seen above, only a very small amount of data need be sent, and the resource information is used to provide the context for the data in updating the graph.

The resource information is used by data stream application 48 to determine the appropriate actions to take in terms of collecting information and sending it to user interface application 32. The data stream is then used by user interface application 32 to update displays on monitor 15. User interface applications 32 communicate with the associated data stream application 48 using remote procedure calls (RPCs) over TCP/IP. The data can relate to a dynamic parameter of interest, such as load of a particular device. The data stream application 48 determines what information should be obtained and the frequency with which it should be obtained and reported to the client device. When the data are sent to user interface application 32, the context for the information is provided by resource information already sent.

Figure 4:
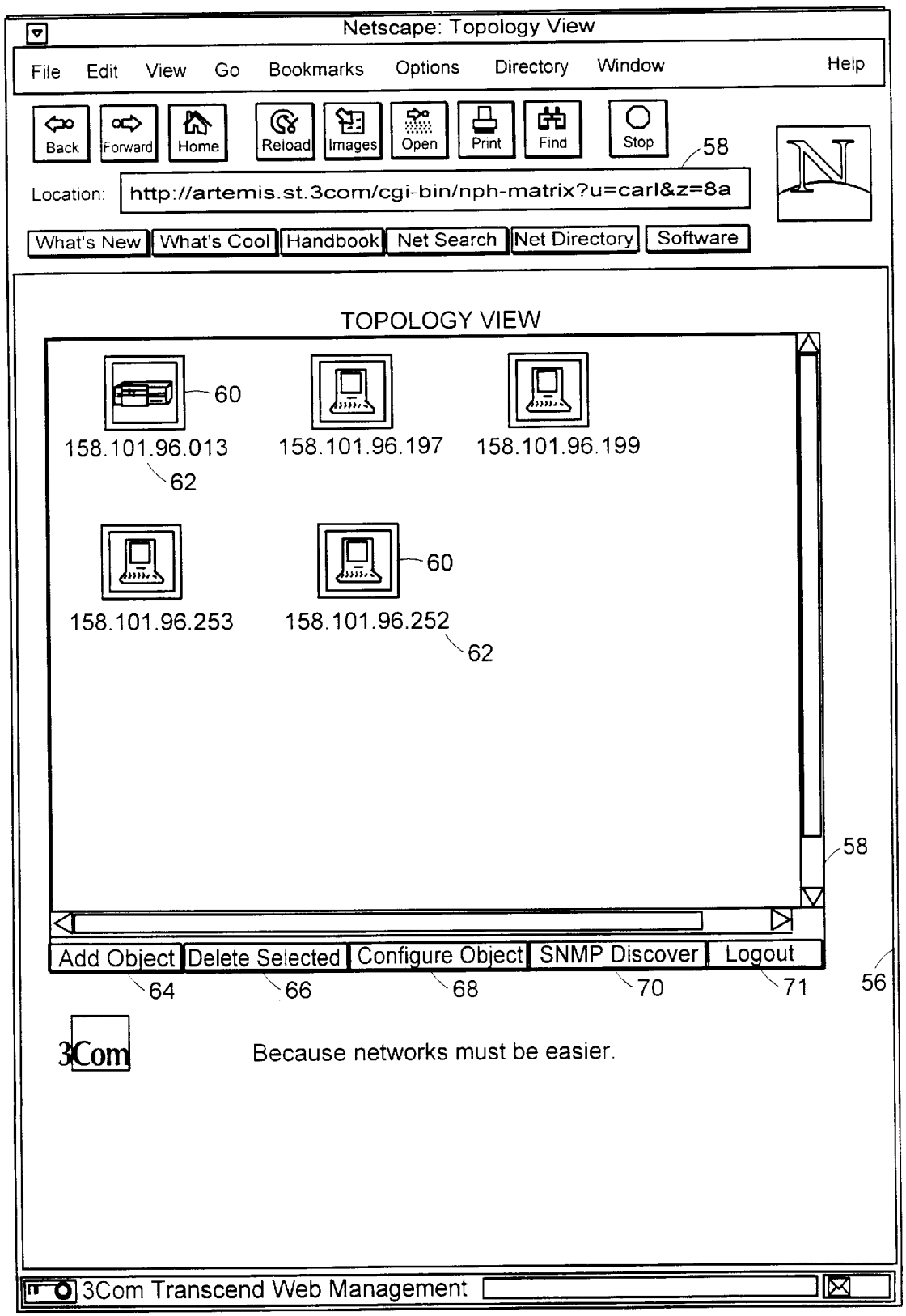

Topology view window 58, shown in FIG. 4, is used to determine which network devices 16–22 will be managed by client device 12. The managed devices are represented by icons 60 and associated numerical or other alias designations 62. Network devices can be added with add object button 64 and deleted with delete selected button 66. Configure object button 68 is used to change specific parameters associated with the particular device. SNMP discover button 70 is used to identify network devices connected at a specified portion of a network for consideration as candidates for inclusion in the group of devices being managed.

FIGS. 5–8 and 12 show other types of windows that can be accessed depending on the particular user interface application 32 and the resource information.

Figure 5:
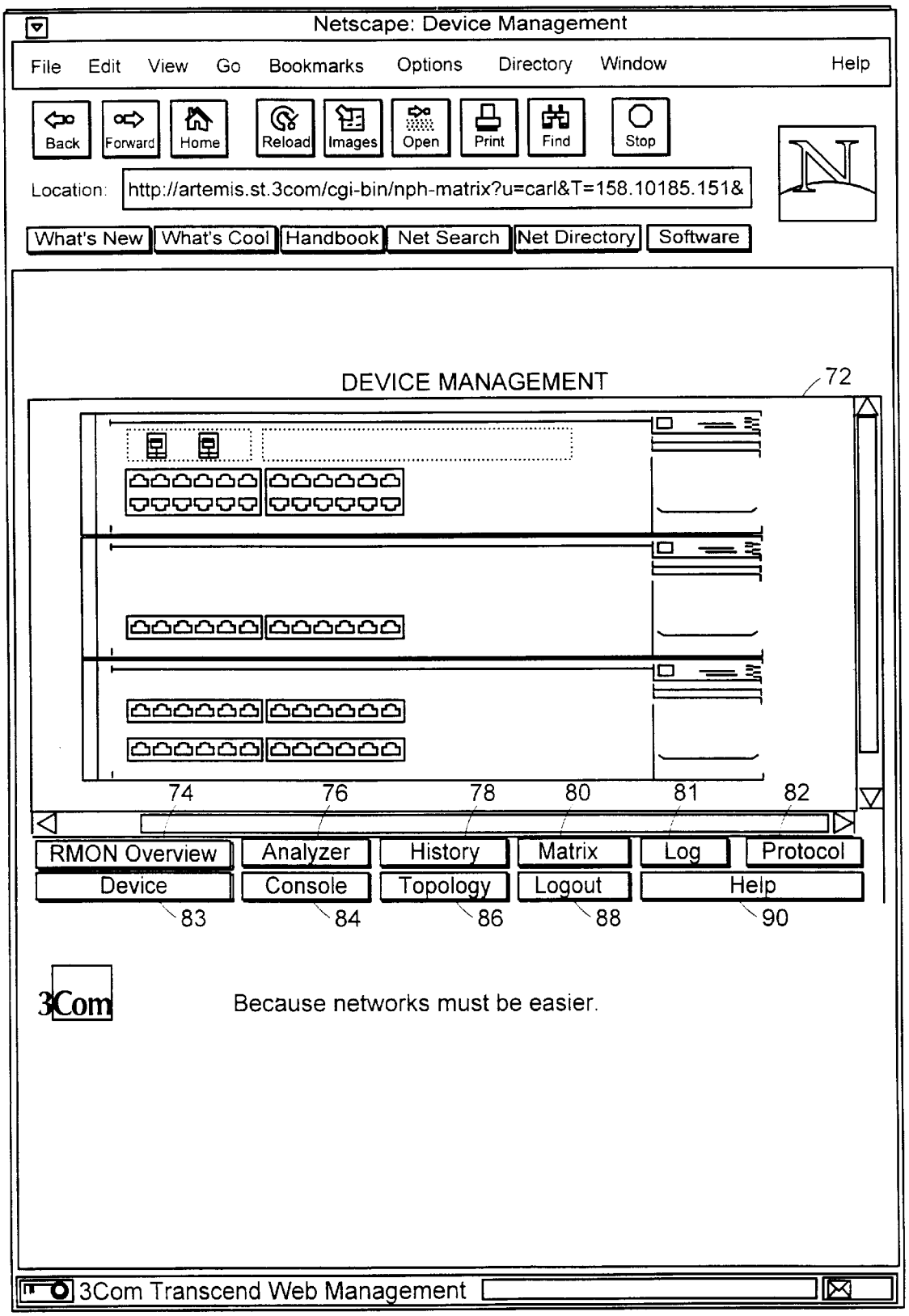
Figure 12:
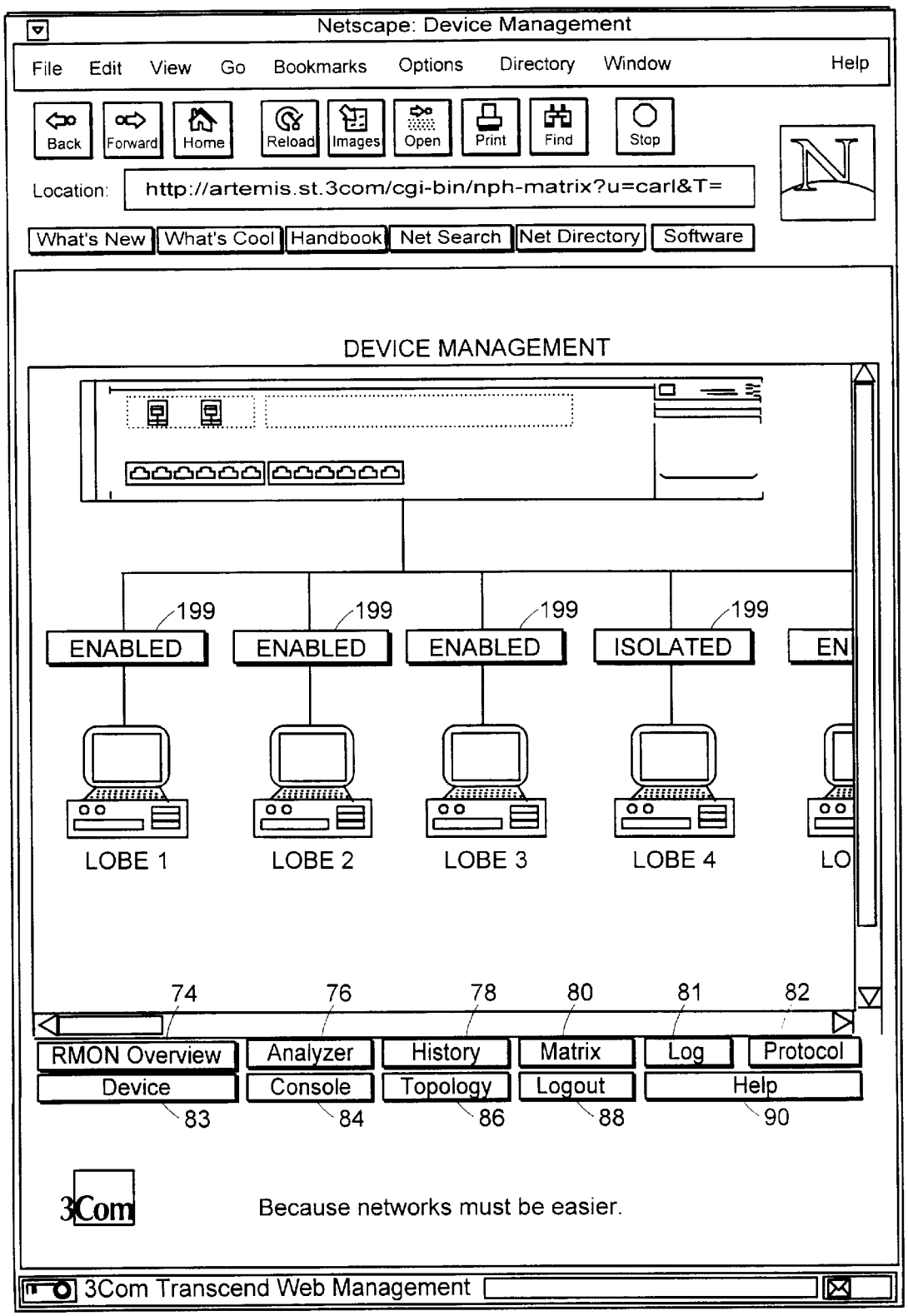
FIG. 12 is an illustration of a display shown on a monitor of the FIG. 1 system.

FIG. 5 shows device management window 72, which can be accessed by clicking on a particular icon 60 for a network device in the topology view window 58 of FIG. 4. Device management window 72 shows a display of three devices, though only the top device is capable of being managed. Buttons 74–90 are used for performing various operations. E.g., topology button 86 is used to return to the topology view screen 58. Activation of buttons 74–82 causes the creation of additional user interface applications 32 and corresponding windows (e.g., as in FIGS. 6. Clicking on the image of the top device in window 72 would cause that device, a hub, to be displayed with the personal computers attached to its ports, as shown in FIG. 12. Box 199 displays "enabled" for personal computers that are connected to the hub, and "isolated" for those that are isolated. Clicking on a box 199 has the effect of connecting or isolating a personal computer via messages that are then sent from the client device to the server device, and from the server device to the controlled device.

FIG. 6 shows protocol tool window 90, which displays pie charts showing the extent that different protocols are used on a network. Clicking on button 96 adjusts the parameters governing operation of the applications 32, 48, in particular, the update rate for the data stream.

FIG. 7 shows RMON overview tool window 100, which can be accessed by clicking on RMON overview button 74 in device management window 72 of FIG. 5. As illustrated in FIG. 7, this window has six display windows: packet size distribution window 74, packet overview window 104, utilization & packet rates window 106, top 10 hosts by packet rate window 108, top 10 hosts by error rate window 110, and RMON device status window 112.

FIG. 8 shows alarm log window 120 which shows RMON alarms and is used to display RMON alarm log entries.

Once a user interface application 32 has been loaded and is running, there are three types of changes to the set up that can by initiated by the user in user interface application 32 as described in FIGS. 9–11.

The first type of user action, described on FIG. 9, has the effect of terminating the current user interface application 32 and associated data stream application 48 and replacing them with a new user interface application 32 and new associated data stream application 48. This action is initiated by activating a button (e.g., button 86 on FIG. 5) or clicking on a graphic object on a display (e.g., on icon 60 on FIG. 4) which requests web server 44 to publish a new page. The page location is supplied as part of the resource information in the case of a fixed button or as part of the data stream in the case of a graphic object on a display. Once the page location is determined, the initiation process of FIGS. 3A and 3B is employed to start the new applications 32, 48.

The second type of user action, described on FIG. 10, involves changing the operation within a given user interface application 32 and associated data stream application 48. This is initiated by activating a button (e.g., button 96 on FIG. 6) or clicking on a graphic object on a display (e.g., 199 on FIG. 12) which requests data stream application 48 to take the indicated action. The message content of the message from application 32 to application 48 is supplied as part the resource information in the case of a fixed button or as part of the data stream in the case of a graphic object on a display. The message then causes the data stream application 48 to take the specified action.

The third type of user action, described on FIGS. 11A adn 11B, involves creating additional windows on monitor 15 and additional pairs of user interface applications 32 and data stream applications 48 without terminating existing user interface applications 32 and data stream applications 48. This is initiated by activating a button (e.g., buttons 64–70 on FIG. 4) or clicking on a graphic object on a display (not shown) which causes the current user interface application 38 to initiate a network connection to daemon 50 to take the indicated action and to spawn a new user interface application 32 to handle the new network connection. The specifics of the daemon are supplied as part the resource information in the case of a fixed button or as part of a data stream in the case of a graphic object on a display. Daemon 50 connects to the new user interface application and spawns a new associated data stream application 48. The new user interface application 32 sends context information to the new data stream application 48; the context information is supplied as part the resource information in the case of a fixed button or as part of a data stream in the case of a graphic object on a display. The new data stream application 48 sends resource information to the new user interface application 32 and begins supplying the appropriate data. The new user application 32 accepts the resource information and creates a new window as specified by the resource information. The new user interface application 32 begins receiving data streams from the new data stream application 48 and updates its displays on monitor 15 accordingly.

The user can select to view the data relating to operation of one or more network devices 16–22 in any variety of ways, including vertical bar graphs, horizontal bar graphs, scrolling lists, line graphs, pie charts, charts, tables, graphic drawing canvases. The code for the application 32 is stored on local disk for server device 14, so that only the code that is being used needs to be loaded.

Other embodiments of the invention are within the scope of the claims.

What is claimed is:

1. A system for providing a configurable graphical user interface for one or more variables of interest specifying the current state of one or more external electronic devices comprising
   a server connected to receive and send information relating to said one or more variables of interest specifying the current state of said one or more external electronic devices, and
   a client communicating with said server via a client/server protocol and providing a user interface for receiving requests from a user and displaying information to said user relating to said one or more variables of interest,
   said client being programmed to initiate a graphical user interface in response to a user input by sending an initiation message to said server,
   said server being programmed to respond to said initiation message by sending resource information establishing a context for interpretation and for display of data relating to said one or more variables to said client and to thereafter send a data stream of data relating to the current state of said one or more variables, and
   said client being programmed to create a graphical user interface that provides a display relating to the state of said one or more variables based upon said resource information and data in said data stream, said resource information providing a context for data in said data stream.

2. The system of claim 1 wherein said server and client are resident on separate platforms and are connected by a network.

3. The system of claim 2 wherein said resource information is provided by an application resident on said server.

4. The system of claim 3 wherein said application is a resource application that is launched in response to said initiation message, and wherein said server also includes a data stream application that sends said data stream over said network.

5. The system of claim 2 wherein said graphical user interface is provided by a user interface application sent from said server to said client subsequent to said initiation message, and wherein said resource information determines the configuration of said display.

6. The system of claim 5 wherein said resource information is sent by a resource application that resides on said server and is launched in response to said initiation message, and wherein said server also includes a data stream application that is established on said server in response to a message from said user interface application resident on said client, said data stream application sending said data stream to said user interface application.

7. The system of claim 4 wherein said client includes a web browser that sends said initiation message, and said server includes a web server that receives said initiation message and launches said resource application in response to said initiation message.

8. The system of claim 6 wherein said client includes a web browser that sends said initiation message, and said server includes a web server that receives said initiation message and launches said resource application in response to said initiation message.

9. The system of claim 6 wherein said data stream application is launched by a data stream initiator resident on said server.

10. The system of claim 6 wherein said user interface application provides an interface for a user to change the system after it has been initiated.

11. The system of claim 10 wherein said change is replacing said user interface application and said data stream application with a new user interface application and a new data stream application.

12. The system of claim 11 wherein said change involves a change in said data stream or a graphic object displayed on said graphical user interface.

13. The system of claim 10 wherein said change is adding a new user interface application and a new data stream application.

14. The system of claim 1 wherein there are a plurality of said data streams sent from said server to said client, each data stream relating to a different said variable.

15. The system of claim 1 wherein at least one of said external electronic devices is a network device connected to a network, and wherein said network device communicates with said server over said network, and wherein said data stream relates to said network device.

16. The system of claim 15 wherein there is a plurality of said network devices connected to said network, and wherein a single said data stream conveys information about said plurality of network devices.

17. The system of claim 1 wherein said graphical user interface includes a plurality of displays based upon a single said data stream.

18. The system of claim 1 wherein said data stream conveys graphical data used to create a graphic object on said graphical user interface.

19. The system of claim 18 wherein said resource information includes the name of a file containing said graphical data used to create said graphic object.

20. The system of claim 1 wherein said data stream conveys numerical data used to draw a representation of the value of said data on said graphical user interface.

21. The system of claim 20 wherein said resource information includes entries defining displays to be created to provide said representation and the format for data in said data stream.

22. The system of claim 20 wherein said display is a pie chart, bar graph, or line graph providing said representation.

23. The system of claim 1 wherein said resource information includes a list of parameter names and parameter values defining said display and said data stream.

24. The system of claim 23 wherein said parameter names and values specify the identity of said server and its location.

25. The system of claim 23 wherein said parameter names identify buttons that will appear on the display, and said parameter values specify actions to be taken when said buttons are activated.

26. The system of claim 25 wherein a said parameter name and value identify a button row length for said buttons appearing on said display.

27. The system of claim 23 wherein said parameter names and values identify a window title, the display layout, and colors to be used.

28. The system of claim 23 wherein said parameter names and values identify the number of data streams, the types of data streams, and names of data streams.

29. A system for managing network devices comprising
a plurality of said network devices connected to a network,
one or more servers connected to said network,
each said server receiving messages from and sending messages to a respective set of said network devices assigned to a said server, said messages from said network devices indicating the states of said network devices, said network devices and respective servers communicating via a standard server/device protocol, and
one or more clients connected to said network and communicating with one or more said servers via a client/server protocol and providing a user interface for receiving requests from a user and displaying information to said user relating to said network devices,
each said client being programmed to initiate a graphical user interface in response to a user input by sending an initiation message to said server,
each said server being programmed to respond to said initiation message by sending resource information establishing a context for interpretation and for display of data relating to said network devices to said client and to thereafter send a data stream of data relating to the current state of said network devices,
each said client being programmed to create a graphical user interface that provides a display relating to the state of said network devices based upon said resource information and data in said data stream, said resource information providing a context for data in said data stream.

30. The system of claim 29 wherein said server and client are resident on separate platforms and are connected by a network.

31. The system of claim 30 wherein said resource information is provided by an application resident on said server.

32. The system of claim 31 wherein said application is a resource application that is launched in response to said initiation message, and wherein said server also includes a data stream application that sends said data stream over said network.

33. The system of claim 30 wherein said graphical user interface is provided by a user interface application sent from said server to said client subsequent to said initiation message, and wherein said resource information determines the configuration of said display.

34. The system of claim 33 wherein said resource information is sent by a resource application that resides on said server and is launched in response to said initiation message, and wherein said server also includes a data stream application that is established on said server in response to a message from said user interface application resident on said client, said data stream application sending said data stream to said user interface application.

35. The system of claim 32 wherein said client includes a web browser that sends said initiation message, and said server includes a web server that receives said initiation message and launches said resource application in response to said initiation message.

36. The system of claim 34 wherein said client includes a web browser that sends said initiation message, and said server includes a web server that receives said initiation message and launches said resource application in response to said initiation message.

37. The system of claim 34 wherein said data stream application is launched by a data stream initiator resident on said server.

38. The system of claim 34 wherein said user interface application provides an interface for a user to change the system after it has been initiated.

39. The system of claim 29 wherein a single said data stream conveys information about said plurality of network devices.

40. The system of claim 39 wherein said graphical user interface includes a plurality of displays based upon a single said data stream.

41. The system of claim 29 wherein said data stream conveys graphical data used to create a graphic object on said graphical user interface.

42. The system of claim 41 wherein said resource information includes the name of a file containing said graphical data used to create said graphic object.

43. The system of claim 29 wherein said data stream conveys numerical data used to draw a representation of the value of said data on said graphical user interface.

44. The system of claim 43 wherein said resource information includes entries defining displays to be created to provide said representation and the format for data in said data stream.

45. The system of claim 29 wherein said resource information includes a list of parameter names and parameter values defining said display and said data stream.

46. The system of claim 45 wherein said parameter names identify buttons that will appear on the display, and said parameter values specify actions to be taken when said buttons are activated.

47. The system of claim 46 wherein a said parameter name and value identify a button row length for said buttons appearing on said display.

48. The system of claim 45 wherein said parameter names and values identify the number of data streams, the types of data streams, and names of data streams.

* * * * *